Sept. 29, 1964  J. B. KUCERA  3,150,885
MATERIAL HANDLING APPARATUS
Original Filed Dec. 7, 1959  4 Sheets-Sheet 1

INVENTOR
JOSEPH B. KUCERA
BY
ATTORNEYS

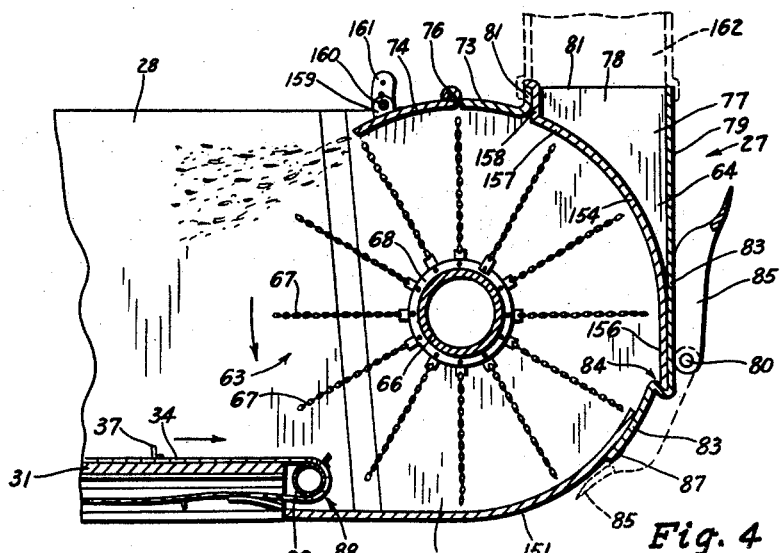
Fig. 4
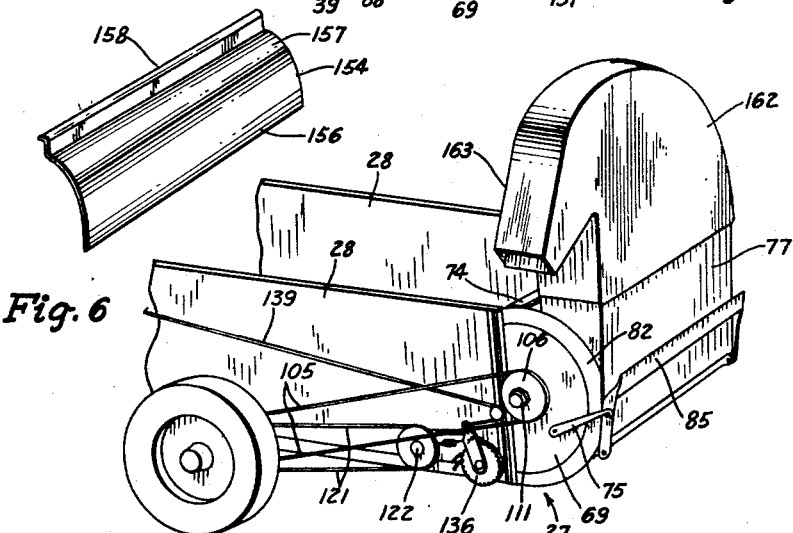
Fig. 6
Fig. 5
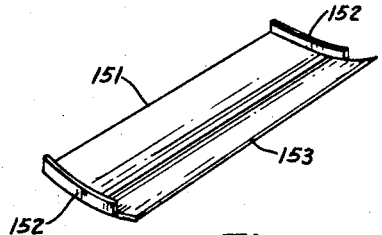
Fig. 7
INVENTOR
JOSEPH B. KUCERA
BY
ATTORNEYS

INVENTOR
JOSEPH B. KUCERA
BY
ATTORNEYS

Sept. 29, 1964   J. B. KUCERA   3,150,885
MATERIAL HANDLING APPARATUS
Original Filed Dec. 7, 1959   4 Sheets-Sheet 4

INVENTOR
JOSEPH B. KUCERA
BY
ATTORNEYS

United States Patent Office 3,150,885
Patented Sept. 29, 1964

3,150,885
MATERIAL HANDLING APPARATUS
Joseph B. Kucera, Traer, Iowa, assignor of one-third to Rudolph L. Lowell, Des Moines, and one-third to Eric M. McElhinney, Dysart, Iowa
Original application Dec. 7, 1959, Ser. No. 857,604, now Patent No. 3,095,202, dated June 25, 1963. Divided and this application Mar. 7, 1963, Ser. No. 263,541
2 Claims. (Cl. 280—479)

This invention relates generally to material handling apparatus and in particular to a combination spreader and loader apparatus for handling fertilizer. This application is a division of application Serial No. 857,604, filed December 7, 1959, now Patent No. 3,095,202, dated June 25, 1963.

An object of this invention is to provide an improved material handling apparatus for farm use.

Another object of this invention is to provide a material handling apparatus wherein a box having a flail assembly at one end, is tiltably supported to provide for the movement of the box and flail assembly as a unit to positions for loading and spreading of the material.

A further object of this invention is to provide a combined fertilizer spreader and loader, which can by the attachment thereto of simple accessory equipment, be converted to grind, mix and unload livestock and poultry feeds.

Yet another object of this invention is to provide a combined loader and spreader apparatus wherein a box and a portable frame, assembled for relative pivotal movement, are pivotally moved by means connected between the frame and box to provide for the tilting of the box relative to the frame when the frame is restrained against pivotal movement, and for the tilting of the frame relative to the box when the box is restrained against pivotal movement.

A further object of this invention is to provide a combined spreader and loader apparatus having a box pivotally supported for movement to spreading and loading positions, in which the means for pivotally moving the box is adapted to adjust a tractor hitch connection on the apparatus relative to the tow bar of a tractor for hitch connecting and disconnecting purposes.

Another object of this invention is to provide an improved material handling apparatus having an open-ended box tiltably mounted on a portable frame and which box is provided with a conveying means movable longitudinally of the floor thereof, wherein a flail assembly at the open end of the box is adapted to engage the ground upon a tilting of the box, and by providing a housing for the box having closable spaced upper and lower peripheral openings, the apparatus is useable as either a loader and spreader, a chopper and loader, or as a combined grinder, mixer and unloader.

Still another object of this invention is to provide a combined fertilizer spreader and loader apparatus which is of a simple economical construction, efficient in operation, and operable by a tractor operator without requiring his leaving the operator's seat.

Further objects, features, and advantages of this invention will become apparent from the following description when taken in connection with the accompanying drawings in which:

FIG. 4 is an enlarged, detail sectional view as seen along the line 4—4 in FIG. 2, with one part shown in changed position, and showing further the assembled position of an accessory item with the apparatus for material mixing purposes;

FIG. 5 is a fragmentary rear perspective view of the apparatus and with the accessory item of FIG. 4 assembled thereto;

FIGS. 6 and 7 are perspective views of two other accessory items adapted for particular use with the apparatus of this invention;

Figure 1:
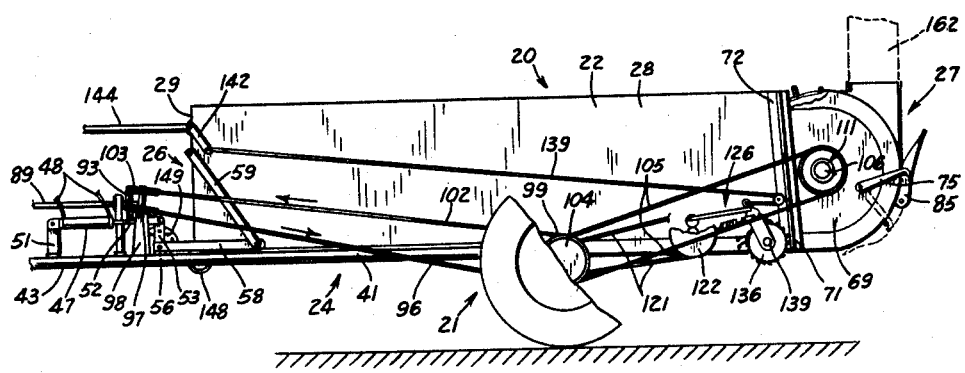
FIG. 1 is a side elevational view of the material handling apparatus of this invention, with some parts broken away, others shown in changed positions, and showing further in dotted lines an accessory item assembled with the apparatus.

Referring now to the drawings and particularly to FIG. 1, the material handling apparatus of this invention is indicated generally at 20, and comprises a wheel and axle unit 21, a box 22 pivotally mounted on the unit 21 and having a conveyor unit 23 mounted therein, a tongue structure 24 also pivotally mounted on the wheel and axle unit 21, a lifting unit 26 supported on the tongue structure 24, and a flail assembly 27 connected to the rear of the box 22. The tongue structure 24 and the wheel and axle unit 21 constitutes a portable frame for the box 22.

As will be described in detail hereinafter, the lifting unit 26 is capable of tilting the box 22 relative to the wheel and axle unit 21 and also relative to the tongue structure 24 whereby the flail assembly 27, by the use of accessory equipment, enables the apparatus 20 to be utilized as either a chopper and loader of corn stalks, as a grain mixer and unloader, or as a loader and spreader of manure or other fertilizer.

Figure 3:
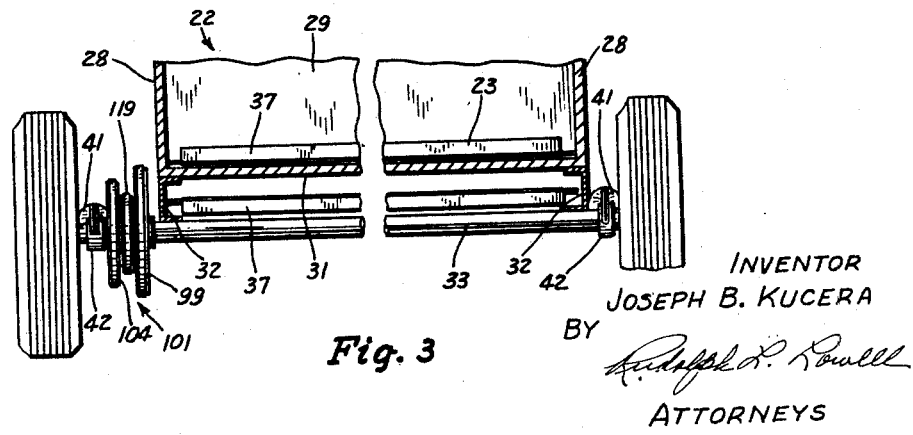
FIG. 3 is an enlarged, foreshortened cross sectional view of the apparatus as seen along the line 3—3 in FIG. 2.

The box 22 (FIGS. 1 and 14) includes a pair of side walls 28, a front end wall 29, and a bottom wall or floor 31, the box 22 being open at the rear end thereof. The floor 31 is supported on a pair of channel irons 32 (FIG. 3) extended lengthwise of the box and secured to a transversely extended tubular housing 33 rotatably mounted about the axle (not shown) of the wheel and axle unit 21.

Figure 2:
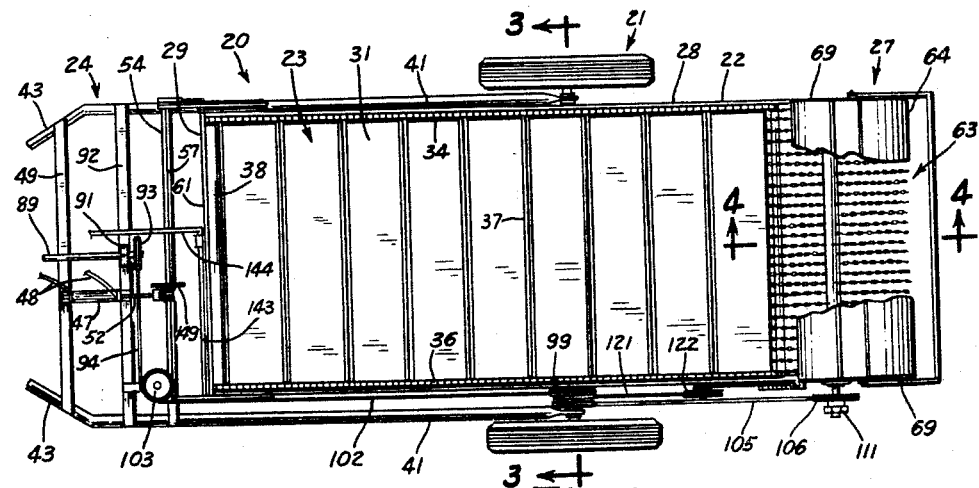
FIG. 2 is a top plan view of the apparatus of FIG. 1, with some parts broken away for the purpose of clarity.

The conveyer unit 23 (FIGS. 2 and 3) includes a pair of transversely spaced, longitudinally running endless chains 34 and 36 cross-connected by a plurality of transverse, longitudinally spaced slats 37. The unit 23 is advanced so that its upper run and the slats thereon move rearwardly over the upper surface of the floor 28, the lower run returning beneath the floor and wherein the channel irons 32 (FIG. 3) act as a guide therefor. As is usual, appropriate shafts 38 and 39 are mounted transversely at each end of the box 22 and carry sprockets (not shown) at each end for the chains 34 and 36.

Figure 11:
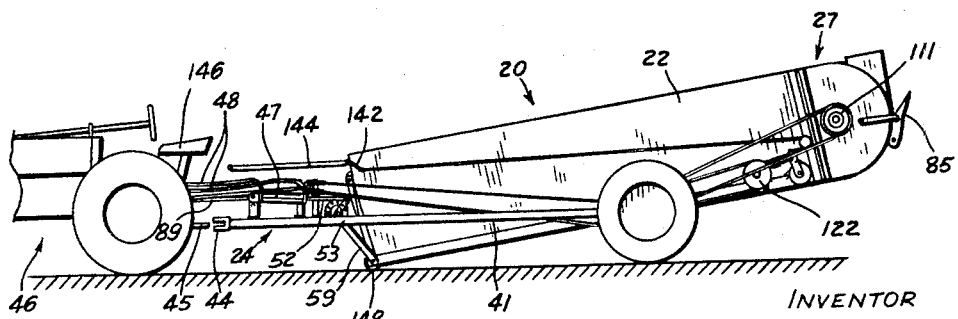
FIG. 11 is a diagrammatic side elevational view of the material handling apparatus of this invention, showing the relative positions of the box and the frame therefor before connection to and after disconnection from a tractor.

The tongue structure 24 includes a pair of side members 41 arranged in the manner of a yoke in that their rear ends (FIG. 1) are spaced for free rotatable attachment, by means of bearing devices 42 (FIG. 3) to the axle housing 33 on each side of the box 22. The front portions 43 (FIG. 14) of the side members 41 are bent inwardly toward each other and are connected at a clevis 44 by means of which the apparatus 20 may be connected to and drawn by a tractor 46 (FIG. 11).

In addition to the tongue structure 24 being pivotally connected to the wheel and axle unit 21, it is utilized as a supporting means for the lifting unit 26. The latter unit includes a hydraulic cylinder assembly 47 (FIGS. 11 and 14) of a double acting type the hoses of which are arranged for connection with the hydraulic system of the tractor 46 so that the tractor operator may operate the cylinder 47. A transverse brace 49 (FIG. 2) is secured across the tongue structure side members 41 for supporting intermediate thereof an upwardly extended support 51 to which one end of the cylinder assembly 47 is pivotally attached. The piston 52 at the other end of the cylinder assembly 47 is pivotally connected at its outer end to an upright rock arm 53 the lower end of which is securely connected to a transverse shaft 54 (FIGS. 2 and 14) extending laterally beyond both side walls 28 of the box 22. The ends of the shaft 54 are mounted on bearings 56 supported at each end of another transverse brace 57 secured across the tongue structure side members 41.

Figure 14:
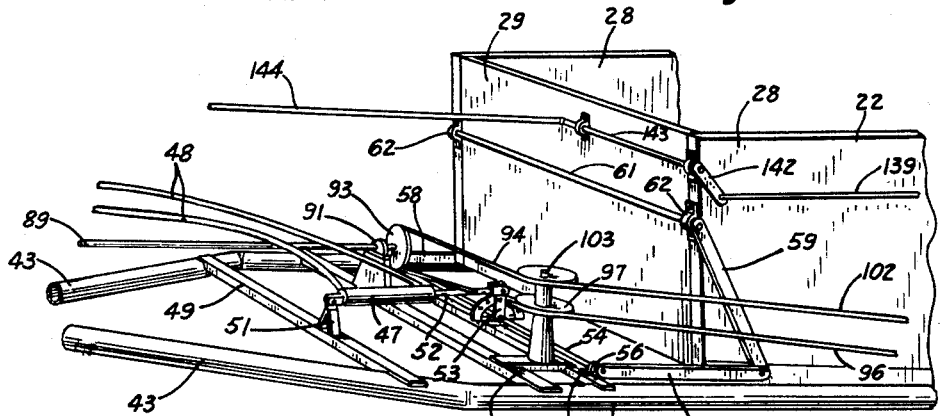
FIG. 14 is a fragmentary perspective view of the front end of the apparatus of this invention.

A link 58 is extended along each side of the box 22 and is rigidly connected at one end to an outer end of the shaft 54, while the other end of each link 58 is pivotally connected to another link 59 extended upwardly also along the side wall 28 of the box 22. The upper end of each upper link 59 is pivotally connected to a rod 61 extending across the box front wall 29 for connecting the links 59, the rod 61 being mounted to the front wall 29 by bearing brackets 62 (FIG. 14). By this arrangement, it may readily be seen that actuation of the hydraulic cylinder assembly 47 operates the linkage 58 and 59 so as to control the position of the box 22 relative to its supporting frame comprised of the tongue structure 24 and the wheel and axle unit 21.

The flail assembly 27 (FIG. 4) is mounted at the rear open end of the box 22 and comprises generally a flail unit 63 rotatably mounted within a housing unit 64. The flail unit 63 is described in detail in Patent 2,958,530 issued November 1, 1960. Generally, the unit 63 includes a shaft 66 (FIG. 4) extended transversely and located rearwardly of the box 22 and provided with a plurality of flails or flexible beaters illustrated at 67 as being of the chain link type. The flails 67 are respectively adjustably mounted on a plurality of longitudinally spaced collars 68 secured to the shaft 66 whereby the flails are arranged in a staggered and spiral pattern around the shaft 66.

The position of the shaft 66 and the adjustable length of the flails 67 are such that upon rotation of the shaft, the outer ends of the flails move in a contiguous position relative to the slats 37 (FIG. 4) of the conveyer unit 23. Additionally, the rotating length of the flails extends into the open end of the box 22 a sufficient amount to contact and engage material at the rear end of the conveyer unit 23.

A housing unit 64 for the flail unit 63 includes a pair of transversely spaced rearwardly curved side plates 69 (FIG. 1) the front flat edges of which are secured to angle irons 71 secured in turn to posts 72 at the rear end of the box side walls 28. Connected to and extended between the curved peripheral rear edges of the side plates 69 is a curved top cover 73 (FIG. 4) which includes a top flap or deflector plate 74 hingedly connected thereto at 76. Integral with the top cover 73 is a U-shaped rear cover 77 including side elements 78 and a rear element 79. The upper edges of the elements 78 and 79 are flush with an upstanding flange 81 at the rear of the top cover 73 while the lower edges 82 of the side elements 78 will follow the contours of the side plates 69 (FIG. 5). The rear element 79 depends substantially vertically (FIG. 4) and has a lower portion 83 bent upwardly and then curved inwardly toward the box 22 to form a groove 84.

Figure 9:
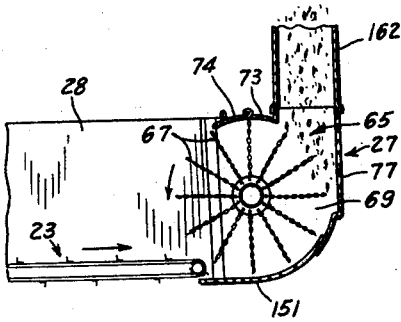
FIG. 9 is a diagrammatic sectional view of the rear of the apparatus showing the arrangement of the flail device housing unit for grain unloading purposes.
Figure 10:
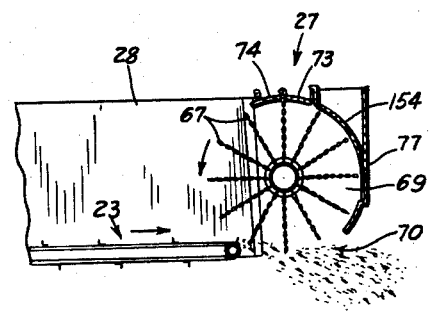
FIG. 10 is a diagrammatic sectional view similar to FIG. 9 and showing the apparatus arranged for material spreading purposes.

As the lower end 87 (FIG. 4) of the portion 83 is spaced substantially from the rear 88 of the conveyer unit 23 to define an opening and as the top cover 73 and rear cover 77 define an opening, it is seen that a pair of radially spaced, laterally extended openings are formed in the housing unit 64 which leaves exposed upper and lower arcuately spaced, peripheral portions 65 (FIG. 9) and 70 (FIG. 10). A scraping bar 85, provided across the rear of the housing unit 64, is pivotally connected thereto at 80 for assuming either an inoperative upwardly extended position, as indicated in full lines in FIG. 1, or an operative downwardly extended position, as indicated by dotted lines in FIG. 1. A pair of hooked arms 75 pivotally connected to the side plates 69 are attachable to the ends of the bar 85 for maintaining it in either position.

In the use and operation of the material handling apparatus, the conveyer unit 23 and the flail assembly 27 are operable, by means hereinafter described, such that the conveyer unit moves material toward the rear of the box 22 where it is concurrently beaten and flailed by the flails 67 moving counterclockwise (FIG. 10) downwardly into and away from the material. Assuming the box 22 to be mounted in a substantially horizontal position as indicated in FIG. 1 and with the tongue structure 24 also substantially horizontal due to its connection to the tractor 46, the apparatus 20 is adapted to either mix material within the box (FIG. 4) to unload material from the box (FIG. 9), or to spread material rearwardly of the box (FIG. 10), with the utilization of one or more attachments now described.

To mix material, the rear of the housing unit 64 is closed entirely by fitting a curved plate 151 (FIG. 7) having upstanding flanges 152 into the lower peripheral opening 70 between the lower end 87 (FIG. 4) of the portion 83 and the rear 88 of the box floor 31. The plate has a lip portion 153 adapted to overlie the end 87 and is of a width so that the flanges 152 clamp over the side plates 69. The upper peripheral opening 65 is also closed by the placement inside the rear cover 77 (FIG. 4) of an insert 154 having a width such as to fit snugly between the side plates 69. The lower portion 156 of the insert 154 is insertable into the groove 84 provided therefor in the rear cover 77, with the upper portion 157 curving inwardly and being provided with an irregular formed finger portion 158 adapted to clamp over the top cover flange 81.

By this arrangement, where the rear of the housing unit 64 is completely enclosed and wherein a curved inner surface is formed concentric with the arcuate path of the extended flails 67, it may readily be seen that the action of the flails against the material being carried by the conveyer unit 23 is such as to pulverize the material while it is being directed in a counterclockwise manner (FIG. 4) back into the box 22. The mixing of the material may be continued and controlled by the operator until the desired mixture and pulverization is obtained. The tangential direction of the material re-entering the box is guided by the hinged top flap 74 which is held in a plurality of adjusted positions by a pin 160 connecting an ear 159 on the flap with a similar but elongated ear 161 on a side plate 69.

To unload material from the box 22, the insert 154 is removed to expose the upper peripheral portion 65. To direct the material discharged upwardly through the exposed portion, due to the counterclockwise rotation of the flails 67 relative to material carried on the conveyer unit 23, a discharge housing 162 (FIG. 5) is provided. The housing 162 is a four sided structure adapted to seat over the upper edges of the rear cover 77 and also the top cover flange 79 in a manner best illustrated in FIGS. 4 and 9. Integral with the housing 162 is a nozzle 163 (FIG. 5) for directing the material downwardly and outwardly from the box 22. The housing can be seated so that the nozzle 163 faces either to one or the other side of the box 22. The provision of a rotatable nozzle is readily envisioned.

To spread material from the box 22, the insert 154 remains in place while the plate 151 (FIG. 4) is removed to expose the lower peripheral portion 70 of the flail housing as best illustrated in FIG. 10. By this arrangement rotation of the flails 67 pulverizes material fed rearwardly of the box by the conveyer unit 23 and uniformly discharges the pulverized material through the exposed portion 70 and rearwardly of the box in a wide path. Although for the mixing, unloading and spreading operations, it was assumed the box 22 was substantially horizontal, in actual practice such need not be the case. In spreading, for example, by varying the height of the housing unit 64 above the ground, the type of spreading and distribution of the material may be varied.

Figure 8:
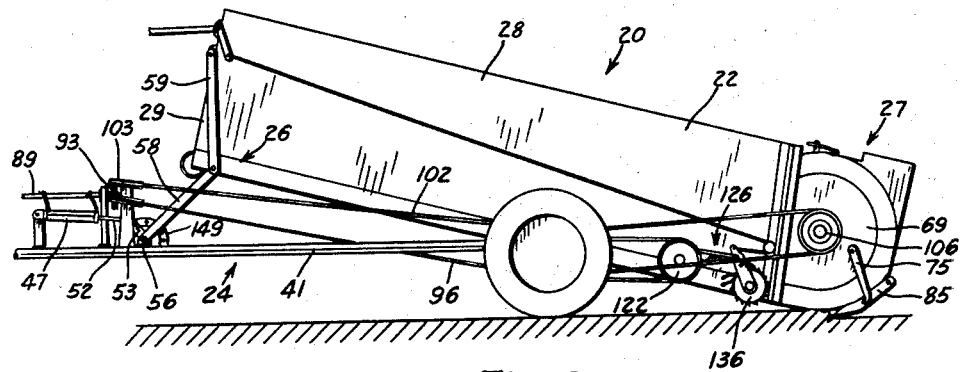
FIG. 8 is a side elevational view of the apparatus of this invention shown in a tilted position for chopping or loading purposes.

Having described the operation of the apparatus 20 for the mixing, unloading and spreading of material, the apparatus is also adapted to operate as a chopper and/or loader as now described. Should it be necessary to move the flail assembly 27 to a position contiguous with the ground, the cylinder assembly 47 (FIG. 8) is actuated to retract the piston 52 so as to pivot the rock arm 53 and thus operate the links 58 and 59 to raise the front end of the box until the flail housing unit 64 at the rear of the box contacts the ground surface.

In this position of the box (FIG. 8) and with the plate 151 removed but with the insert 154 in place (see FIG. 10) it may readily be observed that the flails 67 rotate closely adjacent the ground sufficient to pick up material, such as manure loosened by the scraping bar 85, and to load this material into the housing unit 64 for discharge into the box 22. The conveyer unit 23 should be disconnected from the driving mechanism during the operation. Additionally, for cutting, chopping and loading corn stalks, the rear end of the box 22 need not be tilted such that the flail housing unit 64 is contiguous with the ground, but the housing unit 64 may be spaced above the ground according to the desire of the operator. For loading material in piles, it is conceivable that the box 22 could be tilted such that the front end is lower than the rear end.

A further operating feature of the apparatus 20 is that of providing, when the apparatus is not in use and is disconnected from the tractor 46, for the tongue structure 24 to remain in a substantially horizontal position (FIG. 11) while the box 22 rests in a forwardly tipped position on the ground. This leaves the apparatus ready for immediate and easy connection to the tractor without the need for jacks etc. to lift up the front of the apparatus 20 for hitching purposes. To assume this position, before disconnecting the clevis 44 (FIG. 11), the cylinder 47 is actuated to extend the piston 52 rearwardly so as to cause the links 58 and 59 to lower the front end of the box until a roller 148 therefor contacts the ground. Upon disconnecting the clevis 44 and the hydraulic hoses 48, the lifting linkage retains its position and the tongue structure 24 remains extended. When use of the apparatus 20 is desired, after connecting the clevis 44 to the tractor draw bar 45 (FIG. 11), by merely retracting the piston the linkage 58 and 59 is operated to lift the front of the box 22 upward until the box is substantially horizontal.

Of note, an arcuate plate 149 (FIGS. 2 and 8) having holes formed therein is supported adjacent the rock arm 53, which is also provided with a hole, for locking the rock arm 53 in any one of its positions, by means of inserting a pin (not shown) through aligned holes in the arm 53 and the plate 149. By locking the rock arm 53, the possibility of seepage loss of hydraulic fluid in the hydraulic system affecting the position of the box relative to the tongue structure is thus averted.

To power the flail assembly 27 and also the conveyer unit 23, power is taken from the rear power take-off (not shown) of the tractor 46 by a shaft 89 (FIG. 2) supported by a bearing unit 91 mounted on a transverse brace 92 secured between the tongue structure side members 41. The shaft 89 rotates a vertically disposed drive pulley 93 which carries a continuous belt 94 the lower strand 96 (FIGS. 1 and 14) of which is trained about a substantially horizontally disposed pulley 97 mounted on a support 98 secured between the transverse braces 57 and 92. The lower strand 96 is then trained along the left side of the box 22 (as viewed from the rear) and under and counterclockwise (FIG. 1) about the inside pulley 99 (FIG. 3) of a three-pulley unit 101 rotatably mounted on the axle housing 33. The strand 96 then becomes an upper strand 102 and is trained back along the side wall 28, around another substantially horizontal pulley 103 rotatably mounted on the support 98 above the pulley 97, and trained back to the drive pulley 93.

Figure 12:
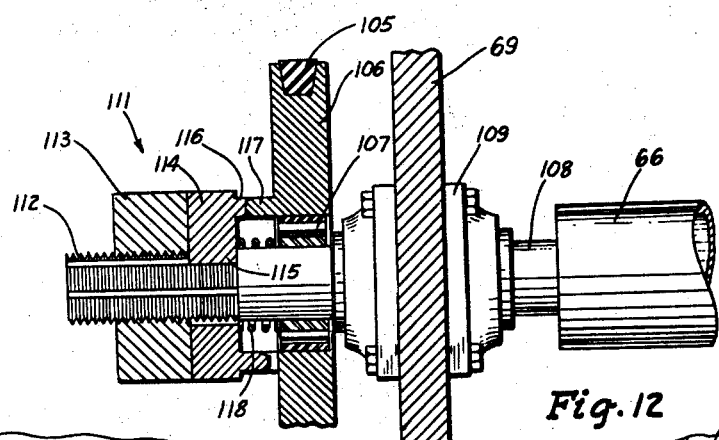
FIG. 12 is an enlarged detail cross sectional view of a releasable clutch unit for the flail assembly of the apparatus.

Power for driving the flail assembly 27 is taken off the outer pulley 104 (FIG. 3) of the three-pulley unit 101 by a continuous belt 105 which is trained about a pulley 106 (FIGS. 5 and 12) rotatably mounted on a bearing 107 mounted in turn on a stub shaft 108 of the shaft 66 which is extended through a bearing unit 109 secured to the side plate 69. To disengage the shaft 66 from the pulley 106 drive, a releasable clutch unit 111 is provided.

The unit 111 includes a lock nut 113 adapted for threaded engagement on the shaft end 112 which is threaded and also longitudinally splined. A clutch plate 114 having teeth 115 for insertion in the splines is mounted on the shaft 112 inside the nut 113, and has radially spaced teeth 116 adapted for interlocking engagement with teeth 117 formed on the outer side of the pulley 106, and a spring 118 mounted on the stub shaft 108 between the pulley bearing 107 and the plate 114. By threading the lock nut 113 away from its normal position and toward the end of the shaft 108, the spring 118 acts to disengage the plate teeth 116 from the pulley teeth 117 so as to disengage the drive of the pulley 106 from the stub shaft 108 and the main flail unit shaft 66. To effect a re-engagement of the teeth so that drive is transmitted from the pulley 106 to the stub shaft 108, the nut 113 is threaded inwardly on the shaft end 112 until the teeth 116 and 117 are engaged.

Drive for the conveyor unit 23 is taken off the middle pulley 19 (FIG. 3) of the three-pulley unit 101 by another continuous belt 121 which is trained about a pulley 122 (FIG. 13) rotatably mounted to the left side wall 28 of the box 22 forward of the rear conveyer shaft 39. The pulley 122 has integral therewith a small gear 123 for driving a larger gear 124 to which a telescopic pawl unit 126 is eccentrically connected for rearward movement in a reciprocal manner.

The pawl unit 126 (FIG. 13), of commercial manufacture, includes a pawl 125 and a housing tube 127 pivotally connected at 128 to the gear 124. The pawl 125 comprises a shaft 129 one end of which is telescopically inserted in the tube 127 and the other end of which is pivotally connected by a pivot pin 130 to a pawl finger 113 adapted to drivingly engage the teeth 134 of a ratchet wheel 136 splined on the outer end of the conveyer rear shaft 39. For reciprocating the pawl 125, a stop member 131 is provided on the shaft 129 adjacent the finger 133 so as to be drivingly engaged by the outer free end 132 of the tube 127.

The pawl 125 is movable against the bias of a return spring 137 to any one of a predetermined plurality of positions relative to the tube end 132 by a yoke 138 pivotally connected at its lower end to the shaft 39 and at its upper end to the pivot pin 130, whereby the stroke of the pawl finger shaft 129 is variable so as to vary the rate of rotation of the ratchet wheel 136 relative to the driving rate of the outer pulley 104 for the conveyor unit 23.

Figure 13:
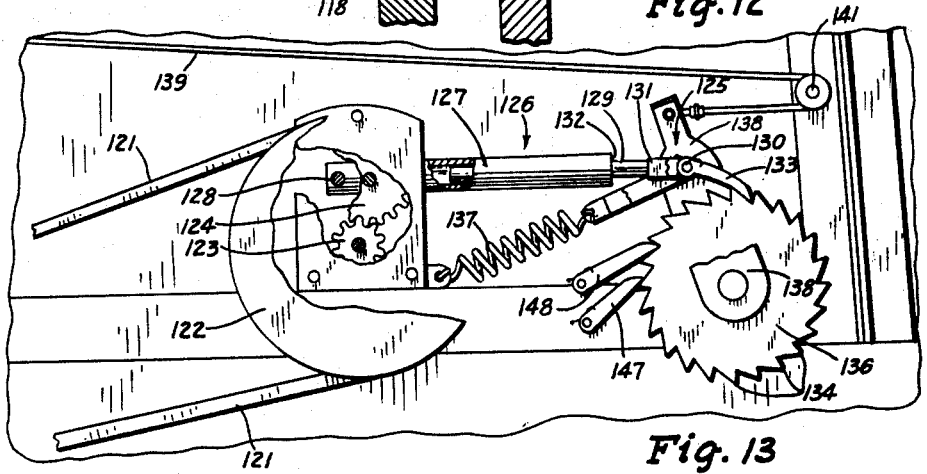
FIG. 13 is a fragmentary elevational detail view of a pawl and ratchet driving unit for the box conveyor of the apparatus.

To provide for remote adjustment of the yoke 138, biased normally counterclockwise as viewed in FIG. 13, the upper end of the yoke 138 is connected to a cable 139 trained about a roller 141, so as to exert a clockwise tension upon the yoke 138, and extended forwardly of the box 22 along its left side wall 28 (FIG. 1). The forward end of the cable 139 is connected to a crank arm 142 pivotally connected to a rod 143 extended across and rotatably mounted to the front of the box 22. The inner end of the rod 143 is connected to a shaft 144 extended toward the operator's seat 146 of the tractor 46 such that a raising and lowering of the shaft 144 pivots the crank arm 142 to pull or release the pawl unit yoke 138 (FIG. 13) relative to its bias. It is noted that each rearward movement of the tube 127 drives the pawl finger 133 and also the yoke 138 counterclockwise (FIG. 13), with the spring 137 acting to return the finger and the yoke back to their initial positions. The cable 139 is thus permitted to slacken and then become taut during each rotation of the gear 124. A pair of holding pawls 147 and 148 are provided for conjoint operation with the teeth 134 of the ratchet wheel 136 whereby a slip of only one-half tooth is allowed by the wheel 136 so as to hold the conveyor drive chains 34 and 36, under constant tension.

Although a preferred embodiment of the invention has been disclosed herein, various alternate constructions and modifications may be made within the scope of the invention as defined in the appended claims.

I claim:
1. A farm trailer implement comprising:
   (a) a wheel and axle assembly,
   (b) a tongue structure of an open construction pivotally connected at the rear end thereof to said assembly,
   (c) a tractor hitch means connected to the front end of said tongue structure,
   (d) a box pivotally supported on said assembly for pivotal up and down movement of the forward end thereof through said tongue structure,
   (e) and means for pivotally moving said box connected to said box and to said tongue structure, said moving means, when the hitch means is tractor-connected, or is disconnected and resting on the ground surface, providing for the pivotal movement of said forward end of the box relative to said tongue structure, and when the hitch means is disconnected and the forward end of said box is resting on the ground surface providing for the movement of said hitch means to a position for connection with the tractor.

2. A farm machine towable by a tractor and comprising:
   (a) a wheel and axle assembly,
   (b) a box pivotally supported between the ends thereof on said assembly for tilting up and down movement,
   (c) a tongue structure including side members arranged along opposite sides of said box for pivotal support of the rear ends thereof on said assembly,
   (d) a tractor hitch means at the front end of said tongue structure, and
   (e) means connected to said box and said tongue structure for tilting said box, said tilting means, when the hitch means is tractor-connected, or is disconnected and resting on the ground surface, providing for an up and down movement of the front end of said box between said side members and relative to said tongue structure, and when the hitch means is disconnected from a tractor and the front end of said box is resting on the ground surface said tilting means providing for the movement of said hitch means, relative to said box, to a position for connection with the tractor.

References Cited in the file of this patent
UNITED STATES PATENTS
2,892,659  Francois ---------------- June 30, 1959